(12) United States Patent
Burton (10) Patent No.: US 9,825,787 B1
(45) Date of Patent: Nov. 21, 2017

(54) DATA STORAGE DEVICE ADAPTING TWO-DIMENSIONAL EQUALIZER BASED ON OFF-TRACK OFFSET

(71) Applicant: Western Digital Technologies, Inc., San Jose, CA (US)

(72) Inventor: Derrick E. Burton, Ladera Ranch, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/595,174

(22) Filed: May 15, 2017

(51) Int. Cl.
| | |
|---|---|
| *G11B 5/09* | (2006.01) |
| *G11B 5/035* | (2006.01) |
| *H04L 25/03* | (2006.01) |
| *G11B 20/10* | (2006.01) |
| *G11B 7/09* | (2006.01) |
| *G11B 5/49* | (2006.01) |
| *G11B 5/48* | (2006.01) |
| *G11B 5/55* | (2006.01) |

(52) U.S. Cl.
CPC ...... *H04L 25/03885* (2013.01); *G11B 5/4886* (2013.01); *G11B 5/4969* (2013.01); *G11B 5/55* (2013.01); *G11B 7/094* (2013.01); *G11B 20/10046* (2013.01); *G11B 5/09* (2013.01)

(58) Field of Classification Search
CPC . G11B 20/10009; G11B 5/09; G11B 2220/90; G11B 27/3027; G11B 5/59655; G11B 5/035; G11B 5/02; G11B 5/012
USPC ...................... 360/24, 39, 49, 55, 65, 67, 68
See application file for complete search history.

(56) References Cited

U.S. PATENT DOCUMENTS

| | | | |
|---|---|---|---|
| 5,422,760 A | 6/1995 | Abbott et al. | |
| 9,013,821 B1 | 4/2015 | Chen | |
| 9,047,205 B1* | 6/2015 | Chen | ...................... G06F 12/00 |
| 9,183,877 B1 | 11/2015 | Chen et al. | |
| 9,245,556 B2 | 1/2016 | Brunnett et al. | |
| 9,245,559 B2 | 1/2016 | Mathew et al. | |

* cited by examiner

*Primary Examiner* — Nabl Hindi (57) ABSTRACT

A data storage device is disclosed comprising a head actuated over a disk, and a two-dimensional (2D) equalizer comprising a plurality of coefficients. A plurality of stored coefficients are accessed based on a first off-track offset of the head in order to first initialize the coefficients of the 2D equalizer, and then the coefficients of the 2D equalizer are first adapted based at least on a first read signal to generate first adapted coefficients. The plurality of stored coefficients are accessed based on a second off-track offset of the head in order to second initialize the coefficients of the 2D equalizer, and then the coefficients of the 2D equalizer are second adapted based at least on the first read signal to generate second adapted coefficients.

21 Claims, 6 Drawing Sheets

DATA STORAGE DEVICE ADAPTING TWO-DIMENSIONAL EQUALIZER BASED ON OFF-TRACK OFFSET

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
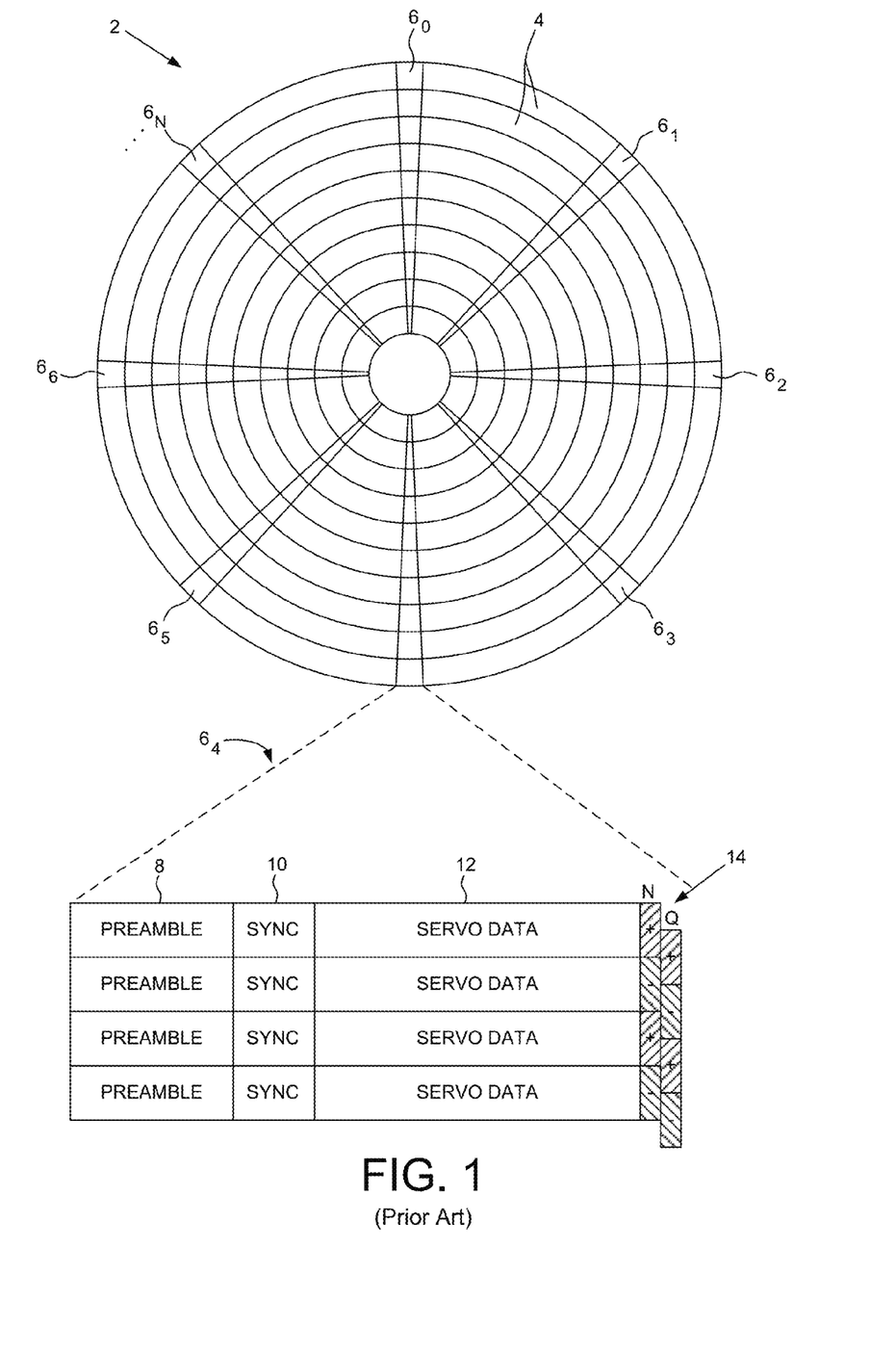
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Two dimensional magnetic recording (TDMR) enables the areal density and/or throughput of each disk surface to be increased by employing multiple read elements that are offset radially so as to sense the magnetic transitions recorded in adjacent data tracks. A two dimensional (2D) equalizer filters the signal samples of the multiple read signals in order to reduce intertrack interference (ITI) prior to sequence detection. The 2D equalizer may be a 2D to 2D equalizer followed by 2D sequence detection, or a 2D to one dimensional (1D) equalizer followed by 1D sequence detection, or a combination of 1D and 2D equalization and sequence detection.

DETAILED DESCRIPTION

Figures 2A, 2B, 2C:
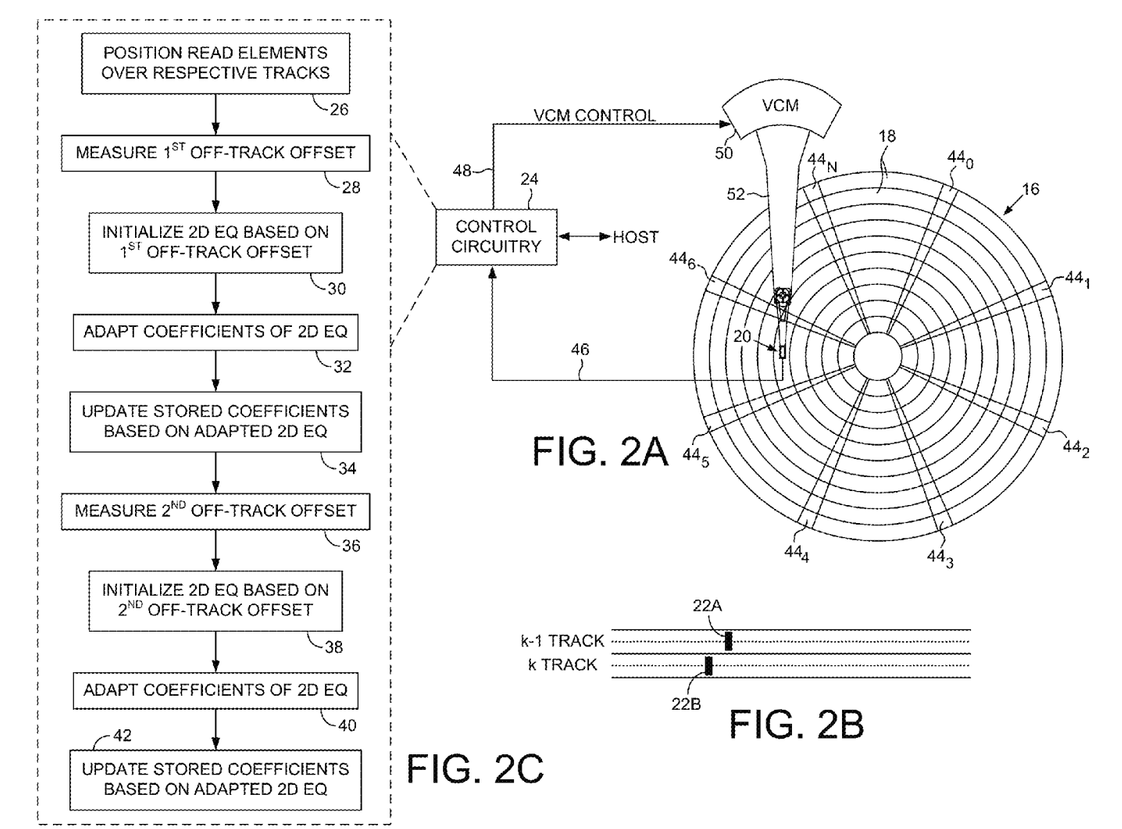
FIGS. 2A and 2B show a data storage device in the form of a disk drive comprising a head actuated over a disk, wherein the head comprises multiple, radially offset read elements.
FIG. 2C is a flow diagram according to an embodiment wherein the coefficients of a 2D equalizer are adapted, and the adapted coefficients used to update a plurality of stored coefficients based on the off-track offset of the head.

FIGS. 2A and 2B show a data storage device in the form of a disk drive according to an embodiment comprising a disk 16 having a plurality of tracks 18, and a head 20 actuated over the disk 16, wherein the head 20 comprises a first read element 22A and a second read element 22B (FIG. 2B). The disk drive further comprises control circuitry 24 comprising a two-dimensional (2D) equalizer comprising a plurality of coefficients, wherein the control circuitry 24 is configured to execute the flow diagram of FIG. 2C. At least part of the first read element is positioned over a first track to generate a first read signal and at least part of the second read element is positioned over a second track to generate a second read signal (block 26). A first off-track offset of the head is measured based on at least the first read signal (block 28), and a plurality of stored coefficients is accessed based on the first off-track offset in order to first initialize the coefficients of the 2D equalizer (block 30). The coefficients of the 2D equalizer are then adapted based at least on the first read signal to generate first adapted coefficients (block 32), and the plurality of stored coefficients is updated based on the adapted coefficients (block 34). A second off-track offset of the head is measured based on at least the first read signal (block 36), and the plurality of stored coefficients is accessed based on the second off-track offset in order to second initialize the coefficients of the 2D equalizer (block 38). The coefficients of the 2D equalizer are then adapted based at least on the first read signal to generate second adapted coefficients (block 40), and the plurality of stored coefficients is updated based on the adapted coefficients (block 42).

In the embodiment of FIG. 2A, the disk 16 comprises a plurality of servo sectors $44_0$-$44_N$ that define a plurality of servo tracks, wherein data tracks are defined relative to the servo tracks at the same or different radial density. The control circuitry 24 processes a read signal 46 emanating from the head 20 to demodulate the servo sectors and generate a position error signal (PES) representing an error between the actual position of the head and a target position relative to a target track. A servo control system in the control circuitry 24 filters the PES using a suitable compensation filter to generate a control signal 48 applied to a voice coil motor (VCM) 50 which rotates an actuator arm 52 about a pivot in order to actuate the head radially over the disk in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3:
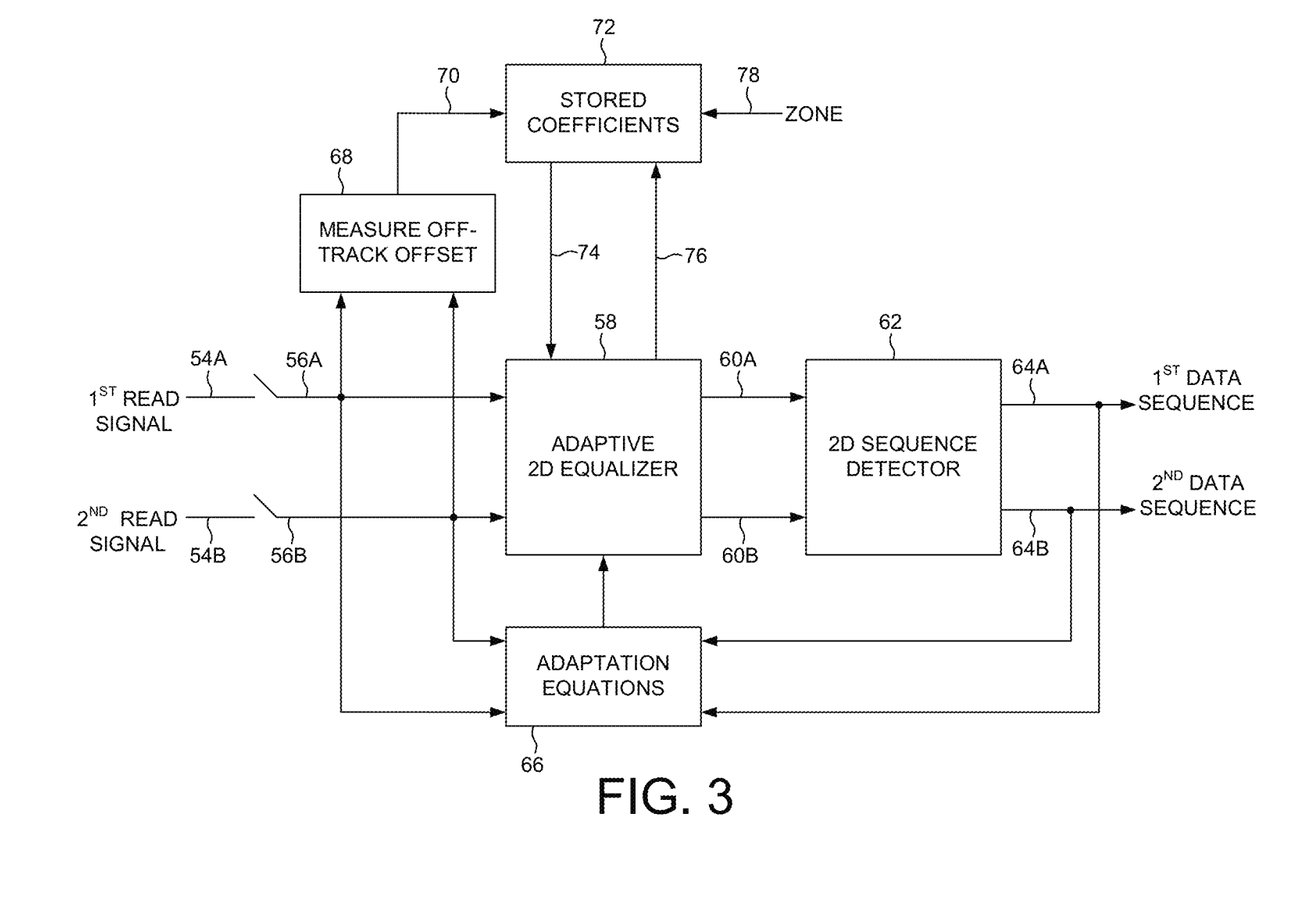
FIG. 3 shows control circuitry according to an embodiment wherein the stored coefficients are used to initialize the coefficients of the 2D equalizer based on the measured off-track offset and a zone the head is over.

FIG. 3 shows control circuitry according to an embodiment wherein a first read signal 54A emanating from the first read element 22A is sampled to generate first signal samples 56A, and a second read signal 54B emanating from the second read element 22B is sampled to generate second signal samples 56B. The signal samples 56A and 56B are filtered with an adaptive 2D equalizer 58 which reduces intertrack interference (ITI), and the filtered signal samples 60A and 60B are processed by a 2D sequence detector 62 which detects a first data sequence 64A recorded in a first track and a second data sequence 64B recorded in a second track. Any suitable adaptive 2D equalizer 58 may be employed, including a 2D to 2D equalizer followed by a 2D sequence detector as shown in FIG. 3, or a 2D to 1D equalizer followed by a 1D sequence detector which may detect a single data sequence from a respective track.

An adaptation block 66 processes the signal samples 56A and 56B and the detected data sequences 64A and 64B in order to adapt coefficients of the 2D equalizer 58. Any suitable adaptation algorithm may be employed in order to adapt the coefficients so as to minimize the errors in the detected data sequences 64A and 64B. In one embodiment, the detected data sequences 64A and 64B may be filtered by a transfer function representing a model of the recording channel in order to generate expected signal samples. The expected signal samples may be subtracted from the actual signal samples 56A and 56B to generate a sample error sequence, and the coefficients of the 2D equalizer 58 may be adapted in a manner that attempts to minimize the sample error sequence using any well-known algorithm.

In one embodiment, the performance of the 2D equalizer 58 may depend on the off-track offset of the head relative to the target track(s). That is, if the head 20 deviates from the centerline of the target track(s) due, for example, to a vibration during a tracking operation, the optimal coefficients for the 2D equalizer 58 may change relative to the degree of the off-track offset. Accordingly, in one embodiment such as shown in FIG. 3 the off-track offset 70 may be measured at block 68, and the measured off-track offset 70 used to access a plurality of stored coefficients 72 in order to initialize the coefficients of the 2D equalizer 58, where the coefficients are then adapted by adaptation block 66. The adapted coefficients 76 are then used to update the set of stored coefficients that correspond to the current off-track offset. In one embodiment, the stored coefficients 72 are saved in a non-volatile memory, such as a non-volatile semiconductor memory (e.g., Flash memory) or periodically written to the disk 16. In this manner, the stored coefficients 72 may be updated over the life of the disk drive to compensate for changes to mechanical and/or environmental conditions that may occur over time.

In one embodiment, the optimal coefficients for the 2D equalizer 58 may also vary relative to a radial location of the head 20 over the disk 16 due, for example, to changes in the skew angle of the head 20, variations in the recording medium, linear speed of the tracks, etc. . . . . Accordingly, in one embodiment the tracks 18 of the disk 16 may be grouped together in radial bands referred to as zones, and the coefficients of the 2D equalizer 58 may be initialized from the stored coefficients 72 based on the measured off-track offset 70 of the head 20 and the zone 78 the head 20 is over. That is, the stored coefficients 72 may comprise a multi-dimensional array of coefficients with one dimension representing the different off-track offsets and another dimension representing the different radial zones.

Figure 4:
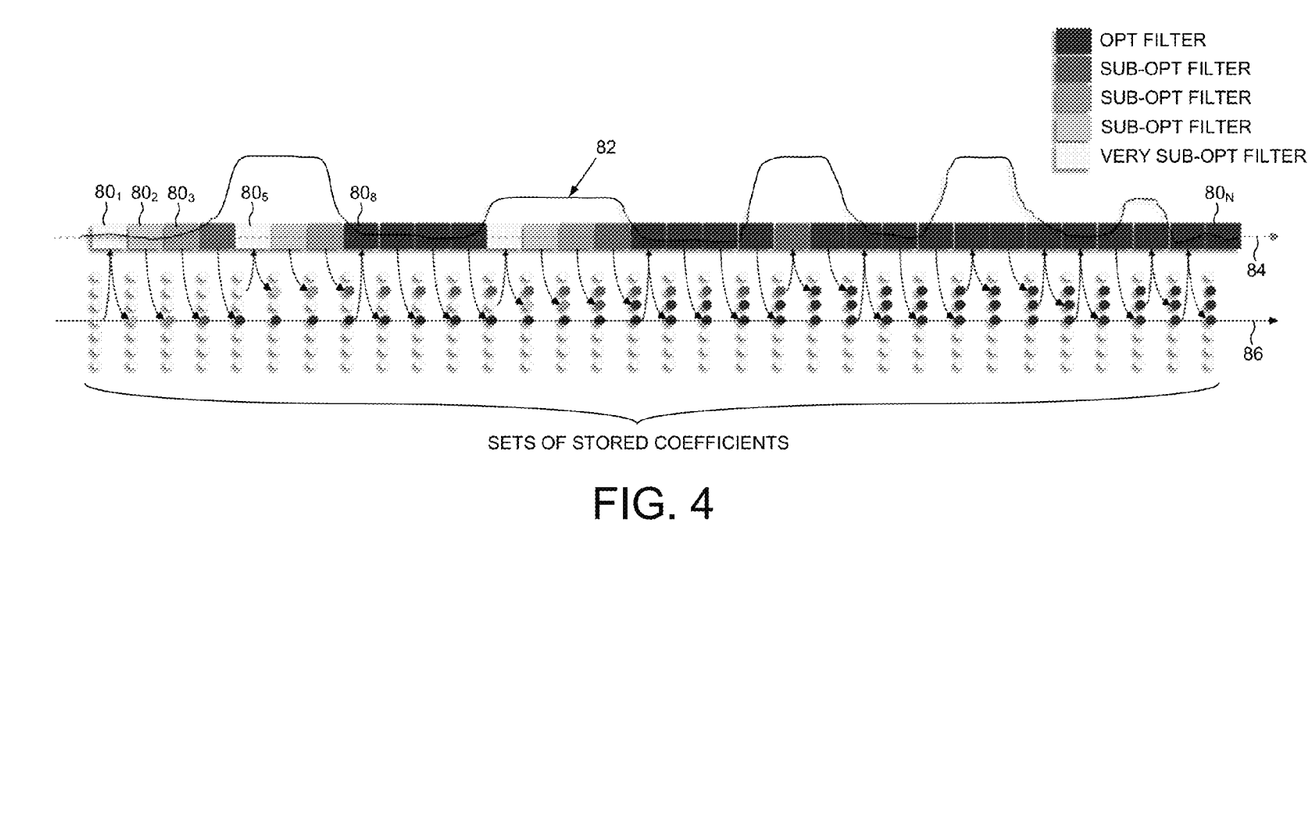
FIG. 4 shows an embodiment wherein the stored coefficients are updated based on the measured off-track offset while performing a tracking operation of a track.

FIG. 4 shows part of a track divided into a number of sections $80_0$-$80_N$, where each section $80i$ may represent the data area of the track between consecutive servo sectors which may include multiple data sectors, or in another embodiment each section $80i$ may represent a single data sector, or in yet another embodiment each section $80i$ may represent part of a data sector. Line 82 represents the position of the head relative to a centerline 84 of the track as the track moves under the head while the disk rotates. The deviation of the head from the track centerline (off-track offset) may be due, for example, to an external vibration affecting the disk drive. The rows of dots illustrated below the track represent the stored coefficients 72 such as shown in FIG. 3, where each dot represents a set of stored coefficients corresponding to a different off-track offset. That is, the middle row of dots along line 86 represents the set of stored coefficients when the off-track offset is zero, and the corresponding rows of dots above and below line 84 represent the sets of stored coefficients for different positive and negative off-track offsets respectively.

The lighter shade of both the sections $80_1$-$80_N$ of the track and the dots in FIG. 4 represents a suboptimal set of stored coefficients for the corresponding off-track offset. In the example shown, the first section $80_1$ and corresponding column of dots are a light shade indicating that the stored coefficients for all of the off-track offsets are very suboptimal (not correctly tuned). Prior to processing the first section $80_1$, the off-track offset is zero and so the corresponding set of stored coefficients are loaded into the 2D equalizer. While processing the first section $80_1$, an adaptation block 66 such as shown in FIG. 3 adapts the coefficients of the 2D equalizer toward more optimal values which are then used to update the corresponding set of stored coefficients as illustrated in FIG. 4. The improved optimization of the set of coefficients corresponding to a zero off-track offset is represented as an increase in the dot shade. Since the off-track offset for the next section $80_2$ is also zero, the shade of this section is also increased. The same procedure of adapting the coefficients of the 2D equalizer is carried out while processing the second section $80_2$, and the further adapted coefficients are used to update the set of stored coefficients with a further increase in the dot shade. Prior to processing the fifth section $80_5$, the off-track offset is positive as shown in FIG. 4 with a corresponding suboptimal set of stored coefficients (light shade) being loaded into the 2D equalizer. After processing section $80_5$ as well as sections $80_6$ and $80_7$, the increase in optimization for the corresponding set of stored coefficients is represented by an increase in the dot shade. Prior to processing section $80_8$, the set of stored coefficients corresponding to a zero off-track offset are reloaded into the 2D equalizer. Since this set of stored coefficients had been previously adapted by processing sections $80_1$-$80_3$, the 2D equalizer is initialized with more optimal coefficients when processing section $80_8$ (and subsequent sections) at a zero off-track offset. Similarly when processing another section of the track having a non-zero off-track offset, the set of stored coefficients that were adapted previously are loaded into the 2D equalizer and further adapted toward more optimal values (leading to an increase in the dot shade). Eventually the sets of the stored coefficients corresponding to different off-track offsets are represented with a darker dot shade to indicate that these coefficients have been adapted to near optimal, and since these near optimal values are stored, the 2D equalizer may be subsequently initialized with near optimal coefficients for any measured off-track offset.

In the embodiment wherein each section $80i$ of the track shown in FIG. 4 represents a wedge of data sectors between servo sectors, the off-track offset may be measured based on the PES generated from reading the servo sectors. In the embodiment where each section 80i of the track shown in FIG. 4 may represent a data sector or part of a data sector, any suitable technique may be employed to measure the off-track offset. In one embodiment, the preamble fields of adjacent data tracks may be recorded with different frequency patterns (e.g., 2 T and 4 T), and the off-track offset measured based on the amplitude of the read signals at these frequencies. In another embodiment, the setting of an automatic gain control (AGC) circuit may represent the amplitude of each read signal which may be processed to measure the off-track offset of the head relative to the tracks. In yet another embodiment, reserved tracks may be used to optimize the stored coefficients for the 2D equalizer, wherein the data sectors of the adjacent reserved tracks may comprise different test patterns that may be processed to measure the off-track offset during a calibration interval. The known test patterns may also improve the performance of the adaptation block 66 (FIG. 3) by avoiding detection errors that may otherwise occur when processing the detected data sequences 64A and 64B output by the 2D sequence detector 62.

Figure 5:
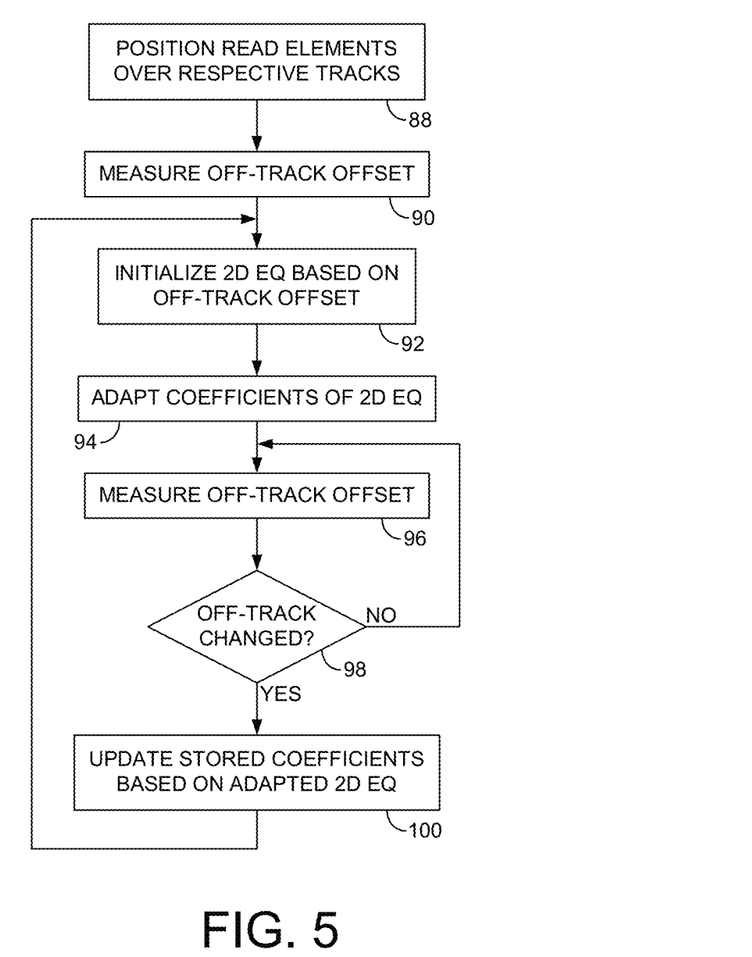
FIG. 5 is a flow diagram according to an embodiment wherein a set of the stored coefficients are updated when the measured off-track offset changes, and the coefficients of the 2D equalizer are initialized based on the set of stored coefficients corresponding to the new off-track offset.

In the example embodiment shown in FIG. 4, the stored coefficients are updated after adapting the coefficients of the 2D equalizer over each section 80i of the track. In another embodiment, the stored coefficients are updated based on the adapted coefficients after the measured off-track offset changes. This embodiment is understood with reference to the flow diagram of FIG. 5 wherein after positioning the read elements over respective tracks (block 88), the off-track offset of the head with respect to the tracks is measured (block 90). The coefficients of the 2D equalizer are initialized based on the measured off-track offset (block 92), and the coefficients are adapted over a section of the tracks. The off-track offset of the head is measured (block 96), and if the off-track offset changes (block 98), the stored coefficients corresponding to the previous off-track offset are updated based on the previously adapted coefficients (block 100). The flow diagram is then repeated from block 92 in order to initialize the coefficients of the 2D equalizer with a set of stored coefficients corresponding to the new off-track offset.

Figure 6:
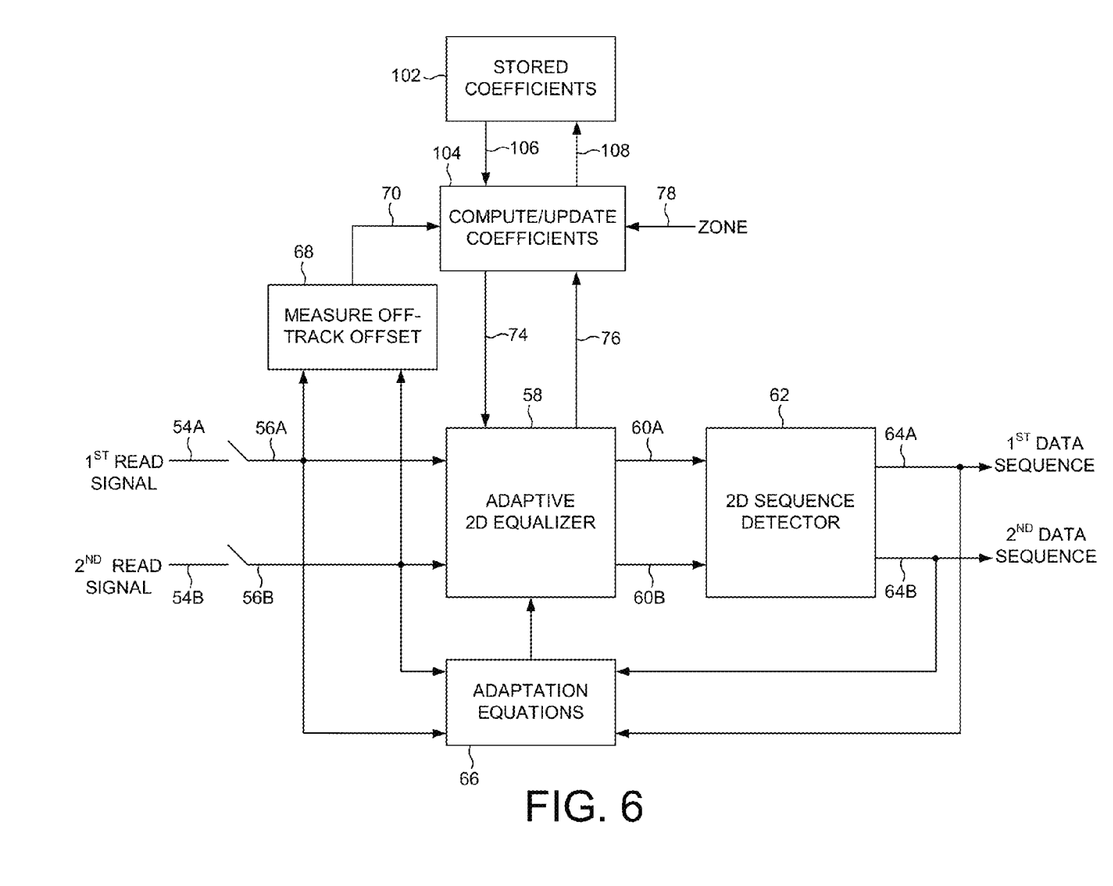
FIG. 6 shows control circuitry according to an embodiment wherein the stored coefficients represent coefficients of one or more polynomials used to compute the coefficients of the 2D equalizer.

FIG. 6 shows control circuitry according to an embodiment wherein the stored coefficients 102 may represent coefficients of one or more polynomials used to compute the coefficients 74 loaded into the 2D equalizer 58. When initializing the coefficients of the 2D equalizer 58, block 104 receives the stored polynomial coefficients 102 over line 106 and computes the coefficients 74 of the 2D equalizer 58 as a function of the current off-track offset 70 (and optionally the current zone 78). In an alternative embodiment, block 102 may store multiple sets of polynomial coefficients, where each set may correspond to a different zone, and the coefficients 74 of the 2D equalizer 58 may be computed as a function of the current off-track offset 70 (or vice versa). When the current off-track offset changes, the adapted coefficients 76 corresponding to the previous off-track offset may be used to update the stored polynomial coefficients 102 over line 108. The polynomial coefficients may be updated in any suitable manner, such as with any suitable curve fitting algorithm. In this embodiment, computing the coefficients of the 2D equalizer using polynomial coefficients may reduce the cost and size of the needed memory, particularly in an embodiment where the polynomial coefficients 102 are stored in a non-volatile semiconductor memory (e.g., Flash memory).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of tracks;
   a head actuated over the disk, wherein the head comprises
      a first read element and a second read element;

control circuitry comprising a two-dimensional (2D) equalizer comprising a plurality of coefficients, the control circuitry configured to:
  position at least part of the first read element over a first track to generate a first read signal and position at least part of the second read element over a second track to generate a second read signal;
  first measure a first off-track offset of the head based on at least the first read signal;
  access a plurality of stored coefficients based on the first off-track offset in order to first initialize the coefficients of the 2D equalizer, and then first adapt the coefficients of the 2D equalizer based at least on the first read signal to generate first adapted coefficients;
  first update the plurality of stored coefficients based on the first adapted coefficients;
  second measure a second off-track offset of the head based on at least the first read signal;
  access the plurality of stored coefficients based on the second off-track offset in order to second initialize the coefficients of the 2D equalizer, and then second adapt the coefficients of the 2D equalizer based at least on the first read signal to generate second adapted coefficients; and
  second update the plurality of stored coefficients based on the second adapted coefficients.

2. The data storage device as recited in claim 1, wherein:
the plurality of stored coefficients comprises multiple sets of stored coefficients; and
each set of stored coefficients corresponds to an off-track offset of the head.

3. The data storage device as recited in claim 2, wherein the first off-track offset is different from the second off-track offset.

4. The data storage device as recited in claim 3, wherein the control circuitry is further configured to periodically measure the off-track offset of the head based on at least the first read signal and when the measured off-track offset changes from the first off-track offset to the second off-track offset, the control circuitry is configured to:
  first update the plurality of stored coefficients based on the first adapted coefficients; and
  access the stored coefficients based on the second off-track offset in order to second initialize the coefficients of the 2D equalizer, and then second adapt the coefficients of the 2D equalizer based at least on the first read signal to generate the second adapted coefficients.

5. The data storage device as recited in claim 2, wherein the first off-track offset is the same as the second off-track offset.

6. The data storage device as recited in claim 2, wherein:
a plurality of zones are defined on the disk, where each zone comprises a plurality of the tracks; and
each set of stored coefficients corresponds to an off-track offset of the head at a zone the head is over.

7. The data storage device as recited in claim 1, wherein while first adapting the coefficients of the 2D equalizer the control circuitry is further configured to:
  process the first read signal to generate a first value representing data recorded in the first track;
  process the second read signal to generate a second value representing data recorded in the second track; and
  first adapt the coefficients of the 2D equalizer based at least on the first value.

8. A method of operating a data storage device comprising a head actuated over a disk, wherein the head comprises a first read element and a second read element, the method comprising:
  processing a first read signal generated by the first read element positioned over a first track on the disk and processing a second read signal generated by the second read element positioned over a second track on the disk;
  first measuring a first off-track offset of the head based on at least the first read signal generated by a first read element of the head;
  accessing a plurality of stored coefficients based on the first off-track offset in order to first initialize coefficients of a two-dimensional (2D) equalizer, and then first adapting the coefficients of the 2D equalizer based at least on the first read signal to generate first adapted coefficients;
  first updating the plurality of stored coefficients based on the first adapted coefficients;
  second measuring a second off-track offset of the head based on at least the first read signal;
  accessing the plurality of stored coefficients based on the second off-track offset in order to second initialize the coefficients of the 2D equalizer, and then second adapting the coefficients of the 2D equalizer based at least on the first read signal to generate second adapted coefficients; and
  second updating the plurality of stored coefficients based on the second adapted coefficients.

9. The method as recited in claim 8, wherein:
the plurality of stored coefficients comprises multiple sets of stored coefficients; and
each set of stored coefficients corresponds to an off-track offset of the head.

10. The method as recited in claim 9, wherein the first off-track offset is different from the second off-track offset.

11. The method as recited in claim 10, further comprising periodically measuring the off-track offset of the head based on at least the first read signal and when the measured off-track offset changes from the first off-track offset to the second off-track offset, the method further comprises:
  first updating the plurality of stored coefficients based on the first adapted coefficients; and
  accessing the stored coefficients based on the second off-track offset in order to second initialize the coefficients of the 2D equalizer, and then second adapting the coefficients of the 2D equalizer based at least on the first read signal to generate the second adapted coefficients.

12. The method as recited in claim 9, wherein the first off-track offset is the same as the second off-track offset.

13. The method as recited in claim 9, wherein:
a plurality of zones are defined on the disk, where each zone comprises a plurality of the tracks; and
each set of stored coefficients corresponds to an off-track offset of the head at a zone the head is over.

14. The method as recited in claim 8, wherein while first adapting the coefficients of the 2D equalizer the method further comprises:
  processing the first read signal to generate a first value representing data recorded in the first track;
  processing the second read signal to generate a second value representing data recorded in the second track; and
  first adapting the coefficients of the 2D equalizer based at least on the first value.

15. Control circuitry for use in a data storage device comprising a head actuated over a disk, wherein the head comprises a first read element and a second read element, the control circuitry configured to:
- process a first read signal generated by the first read element positioned over a first track on the disk and process a second read signal generated by the second read element positioned over a second track on the disk;
- first measure a first off-track offset of the head based on at least the first read signal generated by the first read element;
- access a plurality of stored coefficients based on the first off-track offset in order to first initialize coefficients of a two-dimensional (2D) equalizer, and then first adapt the coefficients of the 2D equalizer based at least on the first read signal to generate first adapted coefficients;
- first update the plurality of stored coefficients based on the first adapted coefficients;
- second measure a second off-track offset of the head based on at least the first read signal;
- access the plurality of stored coefficients based on the second off-track offset in order to second initialize the coefficients of the 2D equalizer, and then second adapt the coefficients of the 2D equalizer based at least on the first read signal to generate second adapted coefficients; and
- second update the plurality of stored coefficients based on the second adapted coefficients.

16. The control circuitry as recited in claim 15, wherein:
the plurality of stored coefficients comprises multiple sets of stored coefficients; and
each set of stored coefficients corresponds to an off-track offset of the head.

17. The control circuitry as recited in claim 16, wherein the first off-track offset is different from the second off-track offset.

18. The control circuitry as recited in claim 17, wherein the control circuitry is further configured to periodically measure the off-track offset of the head based on at least the first read signal and when the measured off-track offset changes from the first off-track offset to the second off-track offset:
- first update the plurality of stored coefficients based on the first adapted coefficients; and
- access the stored coefficients based on the second off-track offset in order to second initialize the coefficients of the 2D equalizer, and then second adapt the coefficients of the 2D equalizer based at least on the first read signal to generate the second adapted coefficients.

19. The control circuitry as recited in claim 16, wherein the first off-track offset is the same as the second off-track offset.

20. The control circuitry as recited in claim 16, wherein:
a plurality of zones are defined on the disk, where each zone comprises a plurality of the tracks; and
each set of stored coefficients corresponds to an off-track offset of the head at a zone the head is over.

21. The control circuitry as recited in claim 15, wherein while first adapting the coefficients of the 2D equalizer the control circuitry is further configured to:
- process the first read signal to generate a first value representing data recorded in the first track;
- process the second read signal to generate a second value representing data recorded in the second track; and
- first adapt the coefficients of the 2D equalizer based at least on the first value.

\* \* \* \* \*